United States Patent

Rud, Jr. et al.

[11] Patent Number: 5,760,310
[45] Date of Patent: Jun. 2, 1998

[54] TRANSMITTER WITH FILL FLUID LOSS DETECTION

[75] Inventors: Stanley E. Rud, Jr., Chanhassen; William E. Petrich, Golden Valley; Bennett L. Louwagie, Plymouth; Terrance F. Krouth, Eden Prairie, all of Minn.

[73] Assignee: Rosemount Inc., Eden Prairie, Minn.

[21] Appl. No.: 770,916

[22] Filed: Dec. 20, 1996

Related U.S. Application Data

[63] Continuation of Ser. No. 346,609, Nov. 30, 1994, abandoned.

[51] Int. Cl.$^6$ ............................................. G01L 9/00
[52] U.S. Cl. ............................................. 73/706; 73/40
[58] Field of Search ....................... 73/40, 706, 715, 73/723, 726

[56] References Cited

U.S. PATENT DOCUMENTS

| | | | |
|---|---|---|---|
| 2,883,995 | 4/1959 | Bialous et al. | 137/85 |
| 3,041,834 | 7/1962 | Davies et al. | 73/40 |
| 3,555,220 | 1/1971 | Wood | 200/83 |
| 3,646,538 | 2/1972 | Frick | 340/200 |
| 3,657,926 | 4/1972 | Munson et al. | 73/404 |
| 3,760,396 | 9/1973 | Haselton | 340/240 |
| 3,975,719 | 8/1976 | Frick | 340/200 |
| 4,077,261 | 3/1978 | Ring et al. | 73/706 |
| 4,244,226 | 1/1981 | Green et al. | 73/703 |
| 4,339,750 | 7/1982 | Delacruz | 340/870.37 |
| 4,610,256 | 9/1986 | Wallace | 128/675 |
| 4,825,116 | 4/1989 | Itoh et al. | 73/642 X |
| 4,825,685 | 5/1989 | Breimesser | 73/4 R |
| 4,833,922 | 5/1989 | Frick et al. | 73/756 |
| 4,896,525 | 1/1990 | Breimesser | 73/1 R |
| 4,912,965 | 4/1990 | Beaver et al. | 73/40 |
| 4,976,149 | 12/1990 | Ichikawa et al. | 73/597 |
| 5,062,297 | 11/1991 | Hashimoto et al. | 73/597 |
| 5,072,190 | 12/1991 | Martin | 324/633 |
| 5,089,979 | 2/1992 | McEachern et al. | 364/571.04 |
| 5,114,664 | 5/1992 | Terhune | 376/245 |
| 5,204,623 | 4/1993 | Terhune | 324/228 |
| 5,357,801 | 10/1994 | Siinclair | 73/290 V |
| 5,531,124 | 7/1996 | Kim et al. | 73/861.27 |

FOREIGN PATENT DOCUMENTS

| | | |
|---|---|---|
| 40 17 843 A1 | 5/1991 | Germany. |
| 63-6431 | 2/1988 | Japan. |
| 4-253220 | 4/1994 | Japan ............... 73/40 |
| 6-102127 | 4/1994 | Japan. |
| 6-307962 | 11/1994 | Japan ............... 73/40 |

OTHER PUBLICATIONS

"Model 1151DP Alphaline® Flow Transmitter," Instruction Manual 4259, published by Rosemount Inc., Eden Prairie, Minnesota 55344, pp. 1, 19.

*Primary Examiner*—Richard Chilcot
*Assistant Examiner*—Paul D. Amrozowicz
*Attorney, Agent, or Firm*—Westman, Champlin & Kelly, P.A.

[57] ABSTRACT

A pressure transmitter has a pressure sensor coupled to an isolator diaphragm by a fill fluid such as oil. According to the invention, means are provided for measuring the position of the isolator diaphragm and comparing the measured position with an expected position to give an indication of fill fluid leakage. Non-contact arrangements such as capacitive and ultrasonic techniques are disclosed for measuring isolator diaphragm position, as well as contacting arrangements such as switches. The fill fluid loss arrangement can be incorporated into a two-wire transmitter, which transmitter can be made to send a warning signal to a control unit when fill fluid loss is detected.

5 Claims, 10 Drawing Sheets

TRANSMITTER WITH FILL FLUID LOSS DETECTION

This is a File Wrapper Continuation of application Ser. No. 08/346,609, filed Nov. 30, 1994, now abandoned. Priority of the prior application is claimed pursuant to 35 USC §120.

BACKGROUND OF THE INVENTION

This invention relates to measurement transmitters used in the process control industry, and more particularly, to such transmitters having pressure sensing cells filled with a substantially incompressible fluid such as oil.

Known process control industry pressure transmitters receive a process fluid and provide an output representative of the pressure of such fluid. In transmitters of interest to the present invention, the process fluid pressure acts on a compliant isolator diaphragm of the transmitter, urging it toward a backplate. The space between the isolator diaphragm and the backplate, and typically a passageway connecting the space to a pressure sensor, are filled with a substantially incompressible fluid such as silicone oil. This fluid filling the space is herein referred to as the "fill fluid". The isolator diaphragm communicates the process fluid pressure to the pressure sensor via the fill fluid. The pressure sensor then outputs a signal representative of the fill fluid pressure, and hence also of the process fluid pressure.

In some instances, however, corrosion or physical damage to the isolator diaphragm or to seals elsewhere in the transmitter can permit some of the fill fluid to leak out of its containment structure. This loss of fill fluid can affect both the static accuracy and, depending on the amount of fluid lost and the operating conditions, the response time of the transmitter, resulting in separate static and dynamic output errors.

For many transmitters, fill fluid loss can be classified into at least two distinct stages: an incipient stage and an advanced stage. In the incipient stage, where the fill fluid loss is relatively small, the transmitter is still essentially fully functional. A small shift or slow drift in the transmitter output can be observed, but the transmitter usually performs substantially within its operating specifications. The physical mechanism causing the drift is a change in fill fluid pressure due to the release of fill fluid; the changed fill fluid pressure in turn causes a shift in the pressure sensor output. Some industries currently monitor the "zero shift" (drift) of installed transmitters on a regular basis to detect fill fluid loss in this incipient stage, before performance is substantially affected. In practice this means the transmitter must be decoupled from the process, calibrated, and "trend-charted".

The advanced stage of fluid loss is characterized by so much fluid being lost as to cause anomalous behavior in the transmitter output. One example of anomalous behavior occurs in transmitters where the pressure sensor is of the type wherein each isolator diaphragm injects or receives a quantity of fill fluid to or from the pressure sensor as the process fluid differential pressure fluctuates. When such a transmitter is subjected to a rapid change in process fluid differential pressure, the fill fluid under one of the isolators is forced or sucked down an orifice in the backplate as it flows to the pressure sensor. Depending on the amount of fill fluid lost, the rate of pressure increase, and the magnitude of pressure increase, the action of the fill fluid draining down the orifice can pull the isolator diaphragm down to almost seal off the orifice, temporarily trapping fill fluid between the isolator diaphragm and the backplate and greatly impeding the flow of more fill fluid to the pressure sensor. The resulting transmitter output tracks the rapid process fluid pressure change for only a short time and then experiences a very slow change in its output toward its expected value as fill fluid slowly migrates past the "seal" to the pressure sensor. Interestingly, a rapid pressure change in the opposite direction (causing fill fluid to be expelled from, rather than drawn into, the orifice in the backplate) will not exhibit this anomaly. The advanced stage of fill fluid loss also includes situations where so much fill fluid has been lost that the transmitter never reaches its expected output for certain applied pressures because of a lack of fill fluid to inject into the pressure sensor, even with the isolator diaphragm pressed against the backplate over the entire surface area of the isolator.

Although various devices and methods have been proposed to detect fill fluid loss, there is a need for a method or arrangement which can conveniently and reliably detect fluid loss, preferably in the incipient stage of fluid loss before transmitter performance is substantially affected.

BRIEF SUMMARY OF THE INVENTION

According to one broad aspect of the invention, a transmitter having a pressure sensor coupled to an isolator diaphragm by a fill fluid includes a position sensor disposed proximate the isolator diaphragm to monitor a position of the isolator diaphragm, thereby to monitor leakage of the fill fluid. Isolator position is an indicator of fill fluid loss because, at a given applied pressure and environmental temperature, loss in fill fluid causes the relative position of the isolator diaphragm to change. In preferred embodiments the position sensor includes a capacitive or ultrasonic transducer which need not contact the isolator diaphragm for an accurate position measurement, and which thus are characterized as "non-contact" position sensors. In other embodiments the position sensor includes a contact-type sensor such as a switch which can have as one of its contact points the isolator diaphragm.

According to another broad aspect of the invention, a transmitter has a pressure sensor coupled to an isolator diaphragm by a fill fluid, the transmitter also having a device monitoring fill fluid loss. Advantageously, the pressure sensor and the fluid monitoring device can utilize substantially the same measurement technique, such as for example a capacitance-based technique. Use of the same measurement technique permits efficient use of duplicative measurement circuitry.

According to still another aspect of the invention, a method for monitoring fill fluid leakage in a two-wire transmitter includes the steps of automatically or periodically measuring a parameter indicative of fill fluid loss, and providing an alarm signal when the parameter exceeds a preset level.

BRIEF DESCRIPTION OF THE DRAWINGS

The invention will be more fully appreciated by a review of the detailed description of the preferred embodiments in connection with the accompanying drawings, of which.

For convenience, items in the figures having the same reference symbol are the same or serve the same or a similar function.

DETAILED DESCRIPTION OF THE PREFERRED EMBODIMENTS

Figure 1:
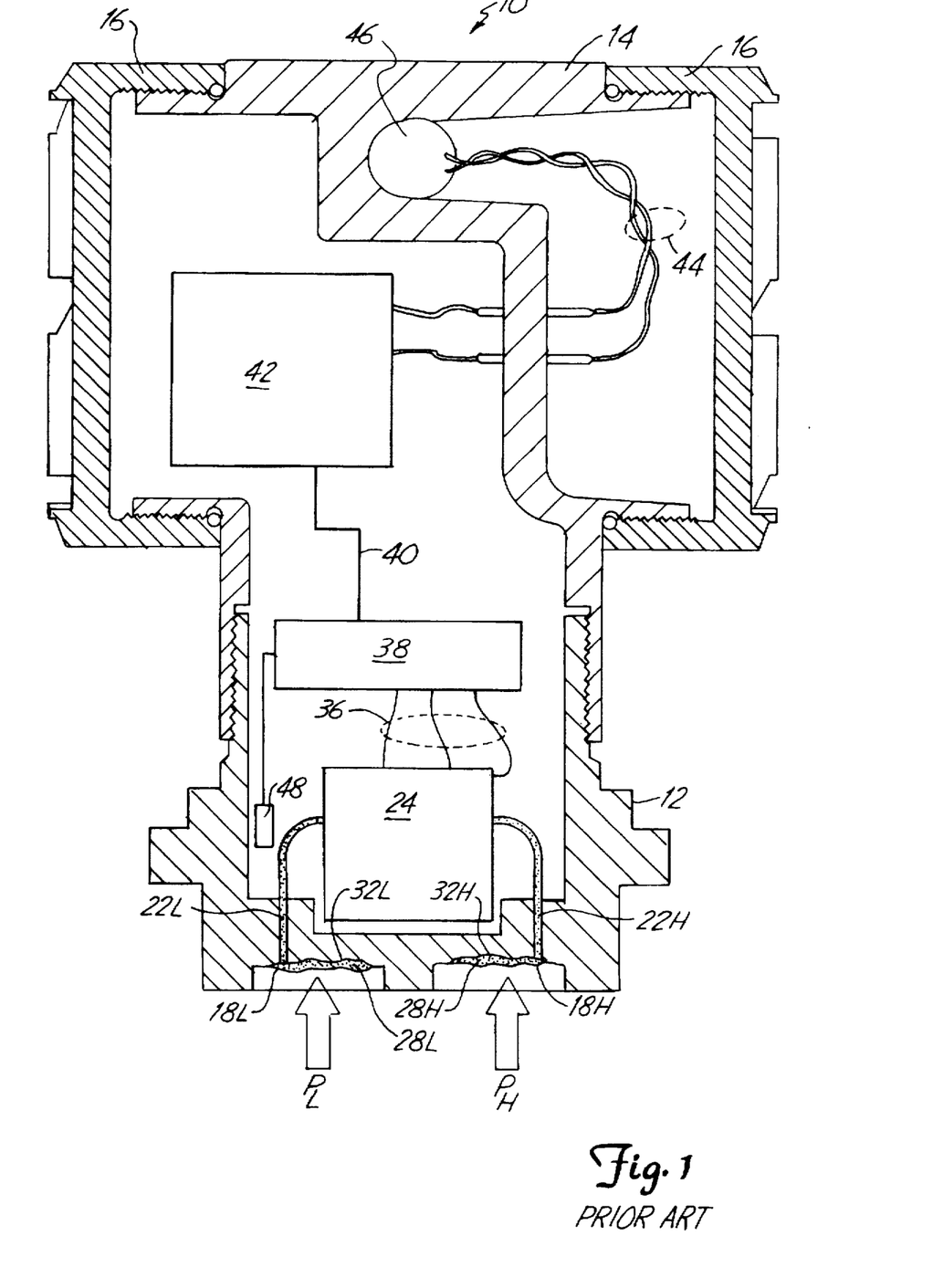
FIG. 1 is a view of a PRIOR ART pressure transmitter shown partially in section and partially in block form.

In FIG. 1, prior art pressure transmitter 10 has a transmitter housing comprising a base 12 and a compartmented body 14, with covers 16 screwed onto opposed ends thereof. External plumbing, not shown, carries two sources of a process fluid into contact with isolator diaphragms 18L,18H. The process fluid sources exert pressures $P_L$ and $P_H$ on diaphragms 18L,18H, respectively. A first quantity of fill fluid 22L transmits pressure $P_L$ to one end of a pressure sensor 24, and a second quantity of fill fluid 22H transmits $P_H$ to another end of pressure sensor 24. Fill fluids 22L,22H fill a space 28L,28H between the isolator diaphragm 18L, 18H and a backplate or stop surface 32L,32H, respectively. As their name suggests, isolator diaphragms 18L,18H are used to isolate pressure sensor 24 from direct contact with the process fluid, while permitting pressure transmission to the sensor via the fill fluid.

Pressure sensor 24 is a capacitance-type differential pressure cell whose capacitance is a function of differential pressure $\Delta P = P_H - P_L$. For purposes of the invention, other known pressure sensors fluidically coupled to isolator diaphragms can be used with the invention, for example strain gauges or optically-based pressure sensors.

Leadwires 36 connect pressure sensor 24 to a preliminary circuit board 38 which in turn connects by line 40 to transmitter circuit 42. An external DC power supply (see FIG. 8a) powers circuit 42 over twisted wire pair 44, which enters transmitter 10 by a port 46. Circuit 42 communicates the process variable $\Delta P$ by regulating the DC current flowing over wire pair 44 between 4 and 20 milliamperes as a function of the measured capacitance. Circuit 42 can also communicate digitally with a control unit over wire pair 44 by known digital protocols, such as the HART® protocol. Transmitter 10 also includes a platinum resistance thermometer (PRT) 48 disposed in transmitter base 12, the PRT measuring a temperature indicative of the temperature of pressure sensor 24 and isolator diaphragms 18L,18H. Of course, alternative temperature sensor technologies are useable with the invention, for example thermocouples. Circuit 38 receives the output from PRT 48, and circuit 42 uses that output to correct the transmitter output $\Delta P$ for temperature-dependent errors in the capacitance measurement.

Figure 2:
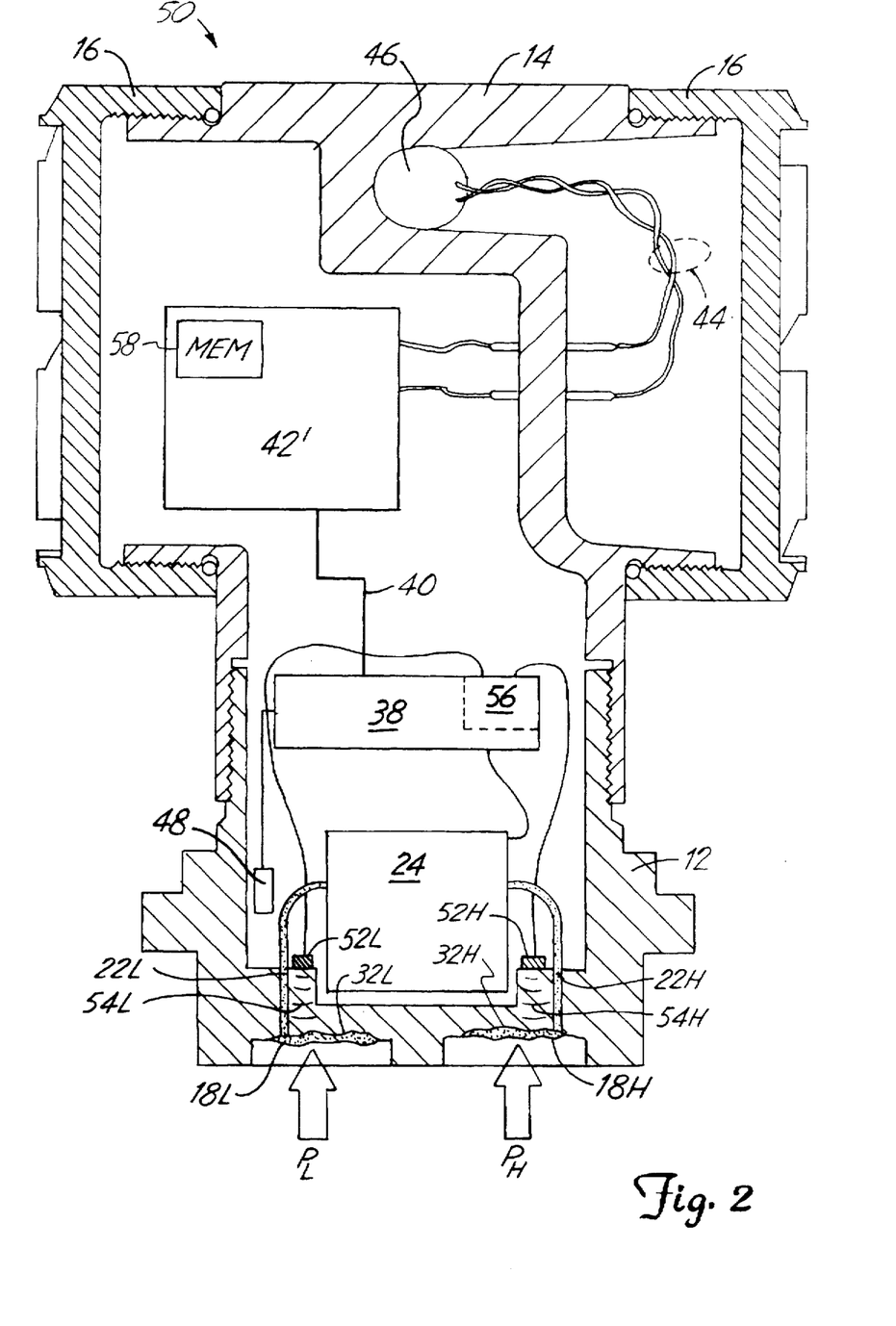
FIG. 2 is a view of one embodiment of the present invention, shown partially in section and partially in block form.

Transmitter 50 of FIG. 2 is similar to the transmitter of FIG. 1, except that it includes means for measuring relative positions of isolator diaphragms 18L,18H. Ultrasonic transducers 52L,52H, firmly bonded to an inside surface of transmitter base 12, launch a pulse of ultrasonic waves or vibrations 54L,54H (typically between 1 and 50 MHz) into transmitter base 12. The vibrations experience a first reflection at the transmitter base/fill fluid interface (i.e., the backplate) and a second reflection at the fill fluid/isolator diaphragm interface. The ultrasonic transducers detect the reflections and communicate them separately to a combination driver/detection circuit 56. Circuit 56 measures the time intervals between the reflections, which time intervals are representative of the separation between each isolator diaphragm and its respective backplate. For added precision, circuit 56 or one of the other transmitter circuits adjusts the measured time intervals as a function of the measured temperature, since the speed of sound in the fill fluid and in the surrounding transmitter structure is ordinarily temperature dependent.

Ultrasonic transducers useable with the invention include the model V208-RM available from Panametrics Inc., 221 Crescent Street, Waltham, Mass., USA 02254. Piezo film elements sold by AMP Inc., Valley Forge, Pa., USA 19482 are also useable with the invention.

Preferably, at regular intervals controlled by a clock in circuit 42', circuit 42' of transmitter 50 performs a diagnostic routine to check for fill fluid leakage. First, circuitry 42' measures the positions, or heights, of diaphragms 18L and 18H. These two values are stored in memory 58. Circuitry 42' also retains in memory 58 the present value of temperature as measured by PRT 48 and pressure $\Delta P$ as measured by pressure sensor 24. During manufacture of the transmitter, a look-up table or a set of coefficients is programmed into a nonvolatile portion of memory 58, which table or coefficients yield an expected value of position for diaphragm 18L and for diaphragm 18H for a given set of pressure $\Delta P$ and temperature values. Temperature is used to correct for thermal expansion effects of the fill fluid. The table or coefficients are computed and stored in memory shortly after sealing the fill fluid chambers, and are computed after measuring the isolator heights during a calibration sequence for various applied pressures and temperatures. During operation, then, circuitry 42' recalls via the table or computes via the coefficients the expected values of the isolator diaphragm positions for the present pressure $\Delta P$ and temperature values. Circuitry 42' subtracts or otherwise compares the stored values of the measured isolator diaphragm positions with the expected values. If the discrepancy for either diaphragm is greater in magnitude than a preset threshold THRESH which is stored in memory 58 and programmable by the user, circuitry 42' can send a warning signal to the control unit by a digital signal or by driving the DC output to a warning level such as 28 mA. THRESH represents the maximum tolerable amount of displacement of the isolator diaphragm caused by a loss in fill fluid, which maximum displacement corresponds to a maximum amount of tolerable fill fluid loss. THRESH can be set to a value low enough to detect incipient fill fluid loss discussed above.

Figure 3:
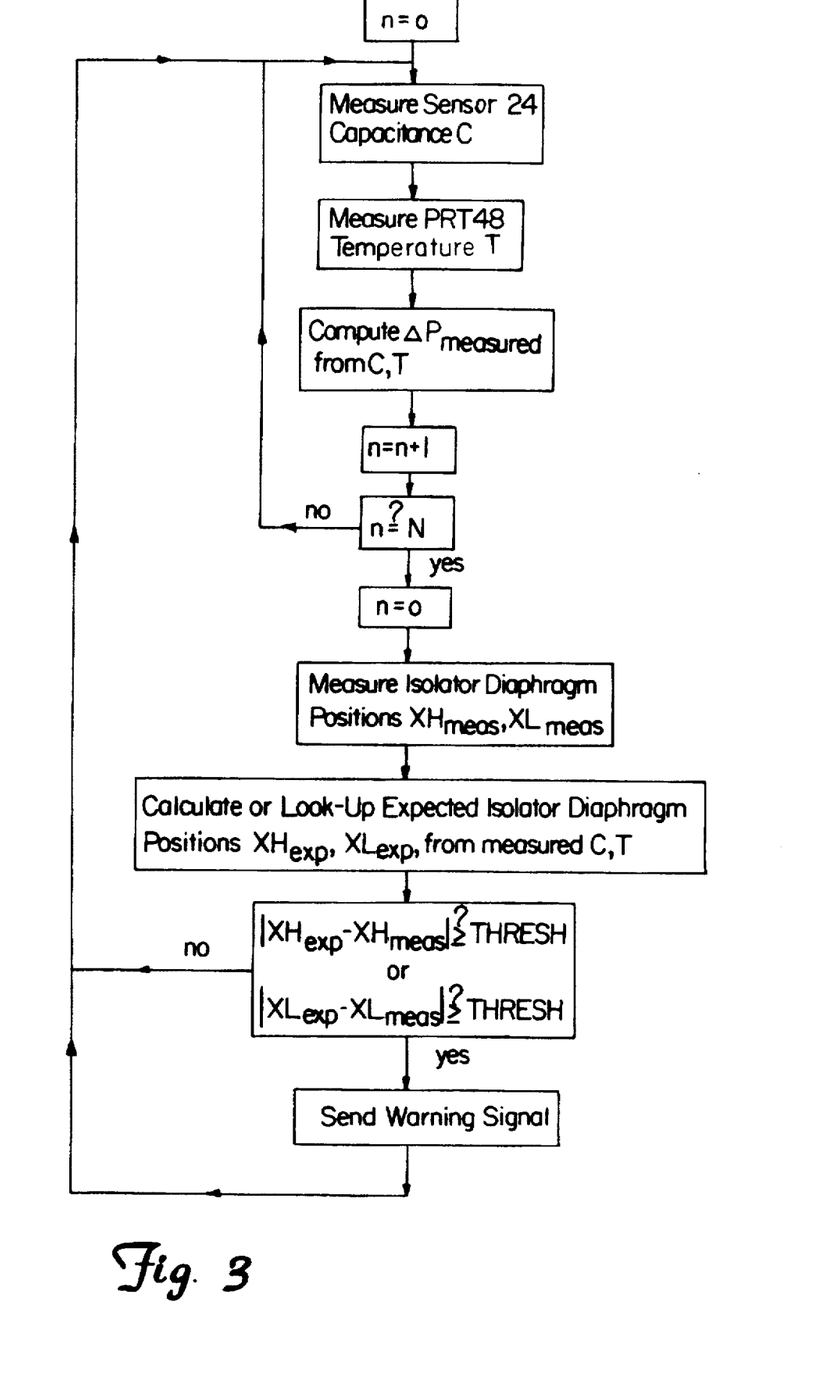
FIG. 3 is a flow chart of a method for detecting fill fluid loss according to the invention.

Circuit 42' can be programmed to perform the diagnostic procedure just described every N pressure measurements, where N is a programmable integer quantity. Where circuit 42' takes pressure readings at a rate of 1 Hz, setting N to $2.6 \times 10^6$ will yield a fluid loss test about once a month. Since the transmitter automatically tests for fill fluid loss, and automatically alerts the control unit in case of failure, the need for a maintenance operator to regularly check the transmitter is eliminated. FIG. 3 illustrates a version of the fill fluid detection procedure just described.

As an additional diagnostic, circuit 42' can store in memory the discrepancies between the measured and expected diaphragm positions, and can predict the transmitter Time To Failure (TTF) by monitoring long-term trends in such discrepancies, under steady state conditions. For example circuit 42' can compute the difference between the two most recently calculated discrepancies for each isolator diaphragm. If the most recent discrepancy ($D_i$) is greater than the previous discrepancy ($D_{i-1}$), but both are lower than the preset threshold THRESH, then TTF (measured in units of the time interval between successive fluid loss tests) can readily be calculated and communicated to the control unit:

$$TTF = \frac{THRESH - D_i}{D_i - D_{i-1}}$$

Circuit 42' can of course use more elaborate known data manipulation techniques such as fuzzy logic or least squares fitting of multiple previously stored discrepancy values to ascertain a trend with which to predict TTF. If desired, the calculated TTF can be stored in the transmitter's memory and communicated to the control unit remote from the transmitter only after a query by the control unit.

A unique benefit of using an ultrasonic technique to measure the isolator diaphragm position is apparent from a comparison of FIGS. 1 and 2. Namely, the technique is compatible with existing transmitter designs with minor hardware modifications, and with no physical intrusion into the fill fluid containment structure or pressure sensor.

Figure 4:
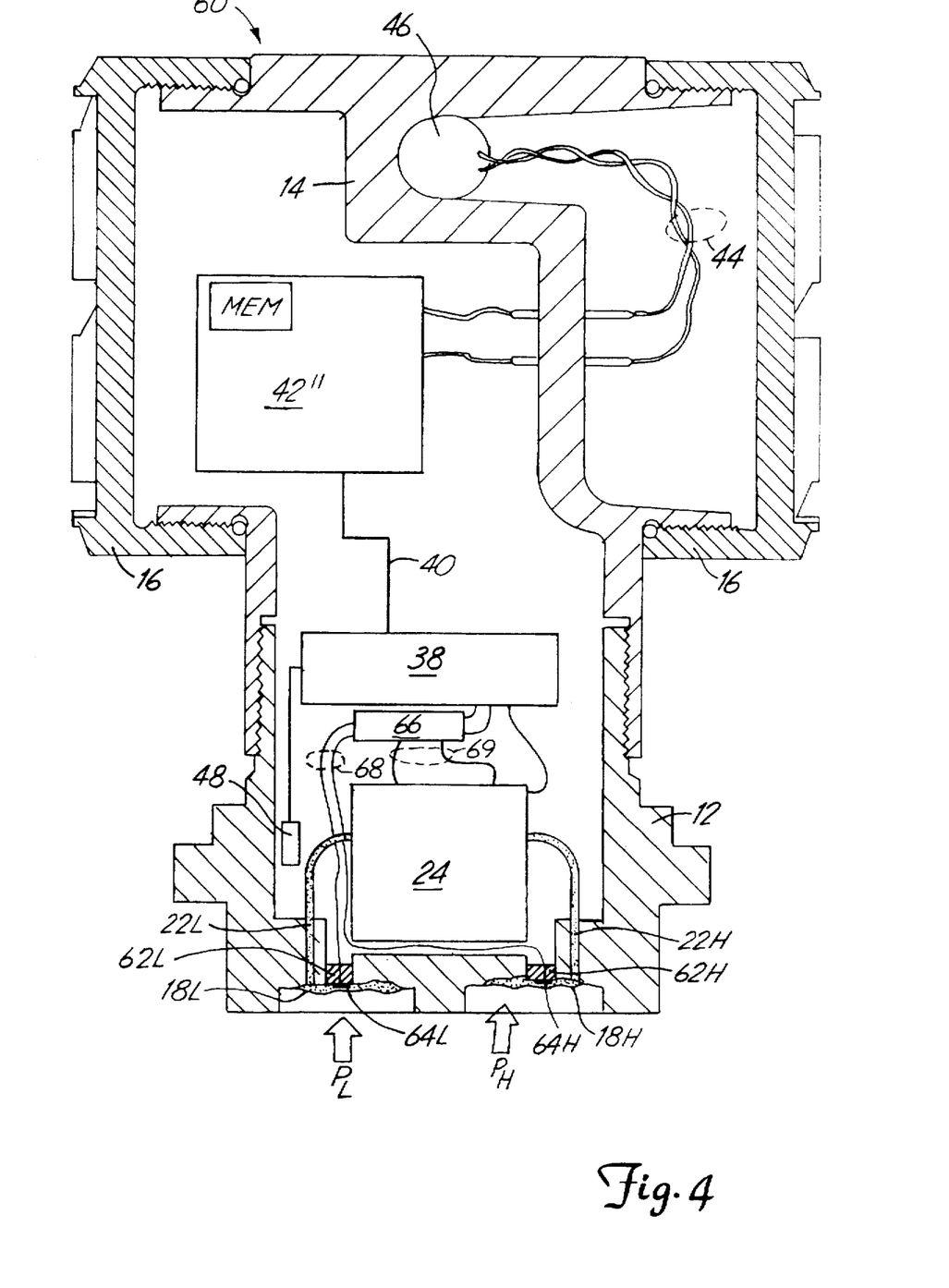
FIG. 4 is a view similar to the view of FIGS. 1 and 2 of another embodiment of the invention.

FIG. 4 shows a transmitter 60 similar to that of FIG. 2, but wherein a capacitive technique for measuring the position of isolator diaphragms 18L,18H is substituted for the ultrasonic technique. Plugs 62L,62H are sealingly held in bores in transmitter base 12 as shown. Each plug carries a small electrically conductive patch or electrode 64L,64H on a side facing the respective isolator diaphragm and in contact with the fill fluid. Preferably, the electrode surface conforms to the surrounding backplate surface. Plugs 62 are constructed such that electrodes 64L,64H are electrically insulated from the transmitter base and from the isolator diaphragms welded thereto. As an isolator diaphragm moves away from or toward its respective plug, the capacitance between the isolator and the electrode decreases or increases. The electrodes are preferably sized such that the capacitance range of each electrode/isolator diaphragm pair is within about a factor of ten of the capacitance range of the pressure sensor 24. This rough parity facilitates the use of the same circuit 38 that measures the pressure sensor capacitance to be used to measure capacitance of the electrode/isolator diaphragm pairs. In a preferred embodiment, transmitter 60 includes a switch 66 controlled by circuit 42", the switch intermittently coupling electrode lines 68 to the capacitance measurement circuit 38. At all other times, switch 66 couples pressure sensor leadwires 69 to circuit 38.

If desired, switch 66 can be eliminated and a dedicated circuit can be added to transmitter 60 to measure capacitance of the electrode/diaphragm pairs. Such a setup would be used where the pressure sensor 24 utilizes a sensing technique other than capacitance, such as strain gauge technology. Beneficially, a reduction in the amount of additional circuit components needed, and hence a reduction in cost and increased reliability, results from the use of switch 66, and from the use of the same sensing technique for the pressure measurement and the isolator position measurements.

Other than the technique by which the isolator diaphragm positions are measured, transmitter 60 of FIG. 4 is in all other respects similar to transmitter 50 of FIG. 2. In particular, the alarm capability, the predictive capacity, and the other features are preferably retained.

Figure 5:
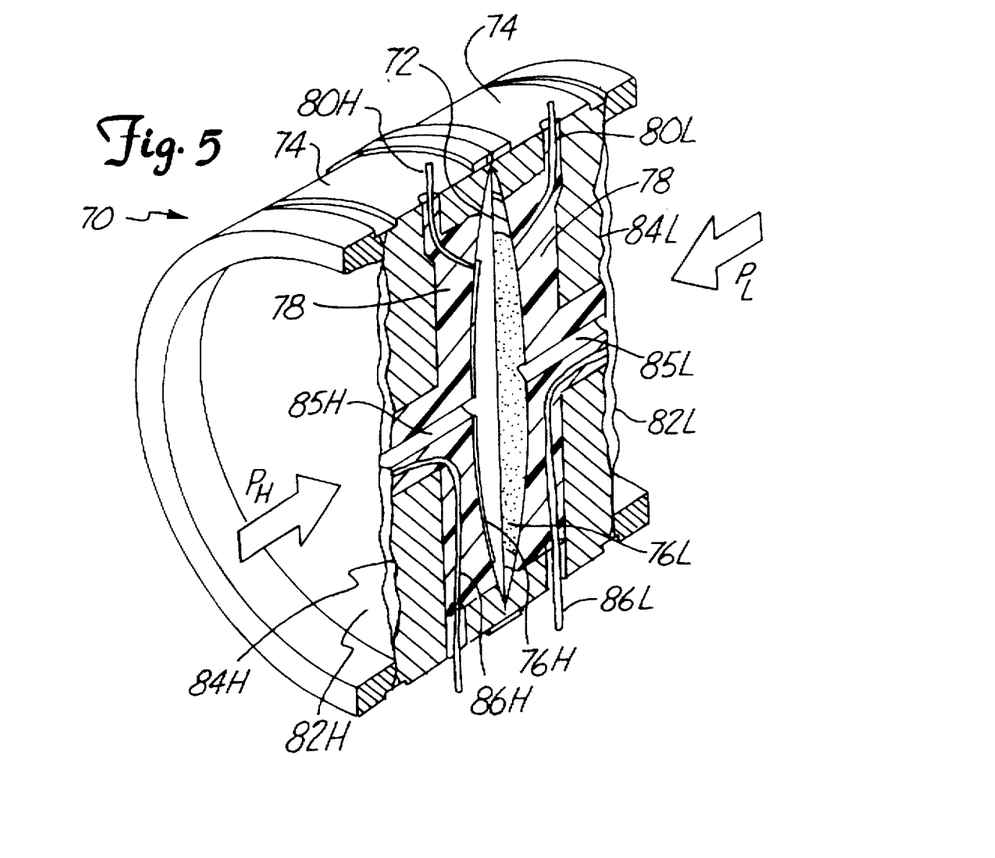
FIG. 5 is a perspective cut-away view of another embodiment of the invention.

FIG. 5 shows another embodiment of a pressure sensor and isolator diaphragm arrangement which has been modified according to the invention. The pressure sensing portion of pressure cell 70 includes a sensing diaphragm 72 welded around its periphery to metallic cell halves 74 and sandwiched between substantially identical sensing electrodes 76H,76L. Sensing electrodes 76H,76L are carried on concave surfaces of molded glass pieces 78. Conductors 80H, 80L, which incidentally are hollow to permit filling of the interior chambers on either side of the sensing diaphragm with fill fluid, connect sensing electrodes 76H,76L to capacitance measurement circuitry not shown in FIG. 5.

Process fluids in contact with isolator diaphragms 82H, 82L exert pressures $P_H$ and $P_L$ as shown on the isolators, which pressures are transmitted to the sensing diaphragm 72 via the two quantities of fill fluid that fill the respective space between isolator diaphragms 82H,82L and stop surfaces 84H,84L, the space between sensing diaphragm 72 and sensing electrodes 76H,76L, and the connecting passageways 85H,85L. According to the invention, pressure cell 70 includes conductors 86H,86L embedded in electrically insulating glass pieces 78, each conductor 86H,86L having a terminus at the respective backplate 84H,84L. The capacitance between each isolator diaphragm and its adjacent conductor 86H,86L provides a measure of the position of each isolator diaphragm. If desired, electrodes similar to electrodes 64L,64H can be added at the backplates of pressure cell 70 to increase the capacitance between the isolator diaphragms and the adjacent conductors 86H,86L.

The embodiment of FIG. 5 clearly operates in a fashion analogous to that of FIG. 4. Thus, the capabilities shown and discussed in connection with the transmitter of FIG. 4 apply equally to the embodiment of FIG. 5.

Pressure cell 70 of FIG. 5 can easily be modified to measure isolator diaphragm position ultrasonically rather than capacitively. An ultrasonic transducer can be fixed at the terminus of each conductor 86H,86L and positioned to launch a pulse of ultrasonic waves through the fill fluid. The time for the waves reflected from the surface of the isolator diaphragm to reach the transducer is indicative of the isolator diaphragm position.

Figure 6:
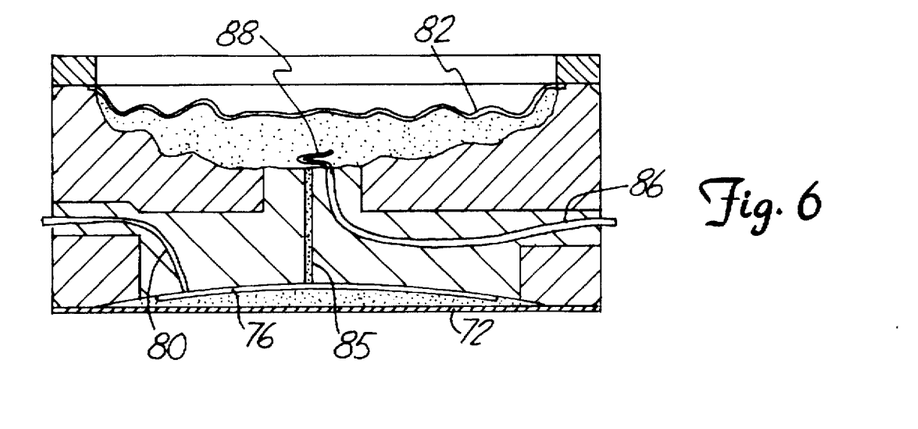
FIGS. 6 and 7 are sectional views of still other embodiments of the invention.
Figure 7:
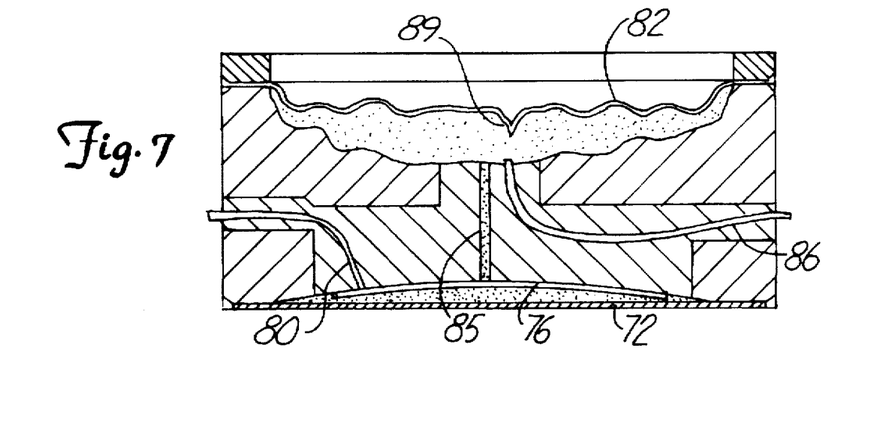

FIGS. 6 and 7 show embodiments of the invention which use a contact-type switch rather than non-contact techniques such as were disclosed above. In FIGS. 6 and 7, only half of the basic pressure cell introduced in FIG. 5 is shown for ease of discussion, and the "H" and "L" designations have been dropped from the reference symbols. In the embodiments of both figures, means are provided for electrical contact of each isolator diaphragm with its adjacent conductor 86 if a sufficient volume of fill fluid leaks out from the associated fill fluid reservoir. Conductor 86 couples to a circuit that provides a warning indication to a control unit when contact is established. In FIG. 6, a spring contact 88 is welded to the terminus of conductor 86. Contact occurs, if at all, between the top of spring contact 88 and the underside of isolator diaphragm 82. In FIG. 7, a dimple 89 has been formed in isolator diaphragm 82 by a rapidly moving blunt tool. Contact occurs here, if at all, between the dimple 89 and the terminus of conductor 86.

Transmitters are normally designed such that at the maximum rated pressure, the isolator diaphragm exposed to the high pressure side moves only about halfway toward the backplate, relative to its equilibrium ($\Delta P=0$) position. In a transmitter where the equilibrium position of the isolator diaphragm (at its center) is 0.010 inches (0.254 mm) measured from the backplate, the isolator diaphragm can be expected to move to within about 0.005 inches (0.127 mm) at maximum applied pressure and at the lowest rated temperature. Any loss in fill fluid will cause the isolator diaphragm to move closer to the backplate under the same conditions. Thus, setting the height of spring contact 88, or the depth of dimple 89, to about 0.005 inches (0.127 mm) or slightly less will permit detection of a slight amount of fill fluid loss (incipient stage losses) at high pressures, and will permit detection of greater losses of fluid at lower pressures.

Figure 8A:
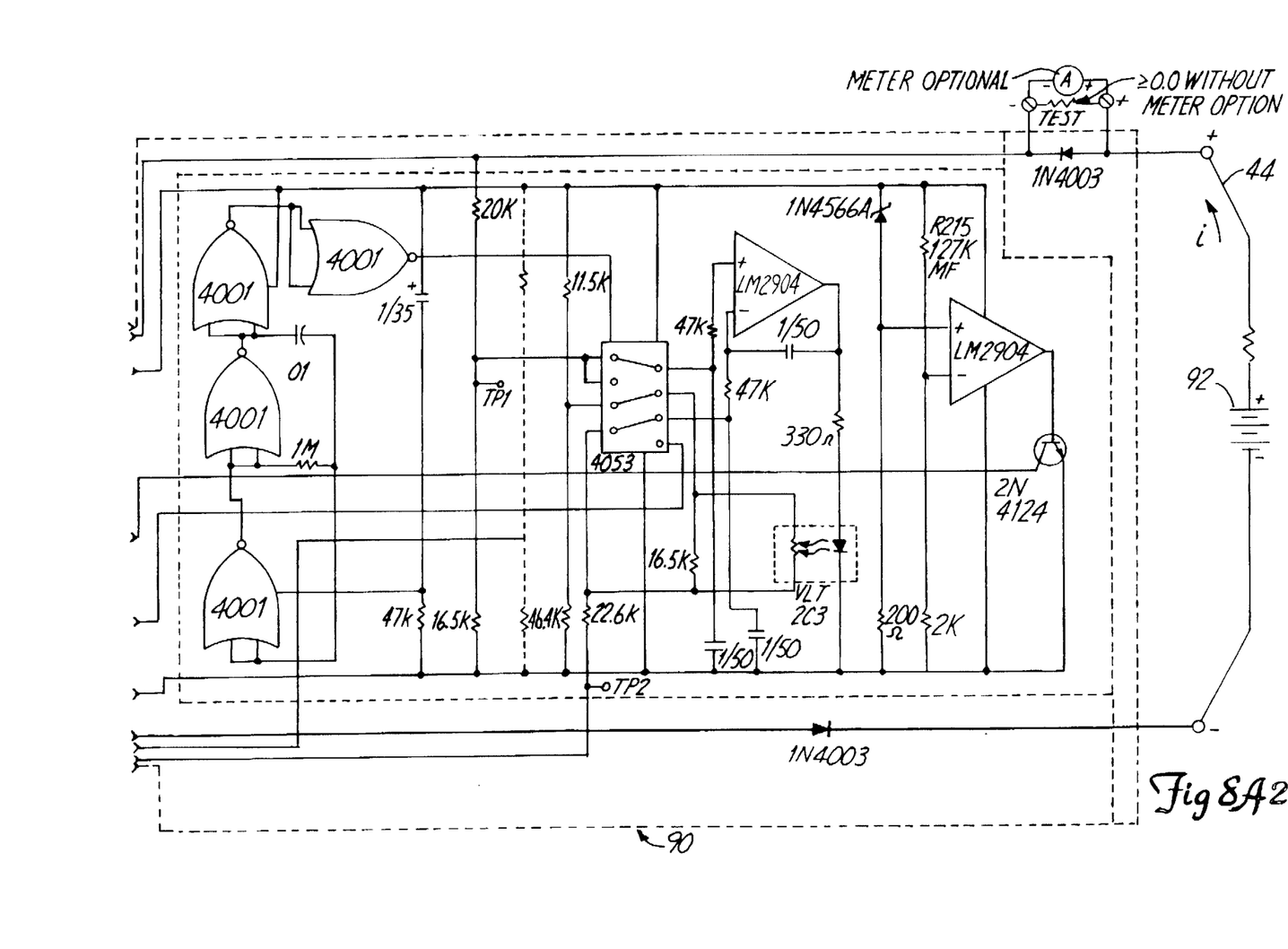
FIG. 8a is a schematic of a conventional capacitance measurement circuit that has been modified for use with the embodiments of FIGS. 6 and 7.
FIG. 8b is a diagram showing the behavior of the output of the circuit of FIG. 8a as a function of process fluid pressure.
Figures 8A, 8B:
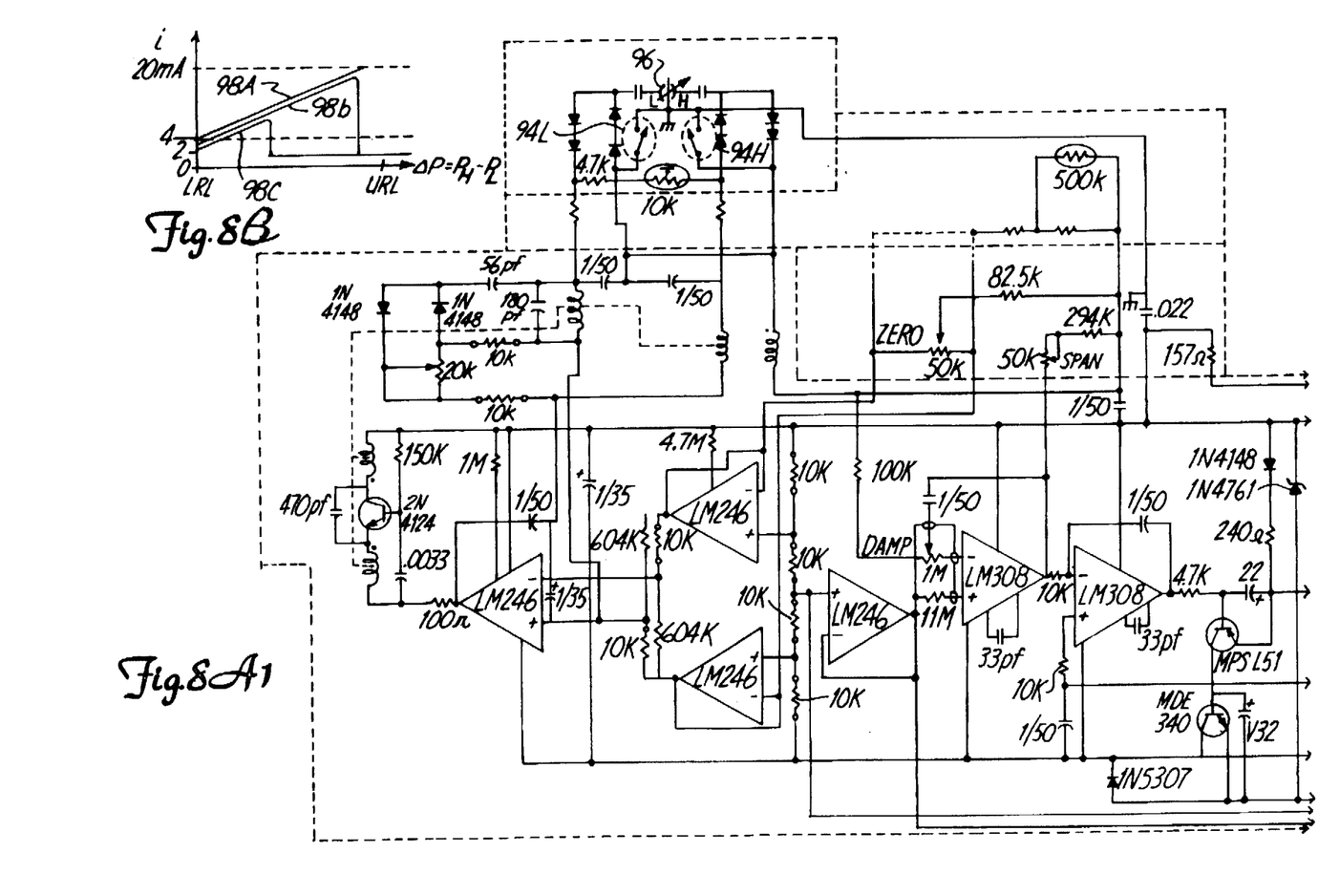

In FIG. 8a an otherwise standard pressure transmitter circuit 90, energized by a remote power source 92 and regulating current flow i through the wire pair 44 as a function of sensed differential pressure, is modified by addition of contact-type switch elements 94L,94H, such as those of FIGS. 5 or 6. One switch is used for each isolator diaphragm. Reference numeral 96 identifies the pressure sensing portion of the pressure cell, shown enlarged in the inset.

With the transmitter circuit connected as shown in FIG. 8a, and with no loss in fill fluid, the transmitter output current i as a function of process fluid differential pressure $\Delta P$ is as shown by curve 98a in FIG. 8b. Curve 98a is substantially linear and varies from 4 mA at a Lower Range Limit ("LRL") to 20 mA at an Upper Range Limit ("URL"). This behavior is the same as that of prior art transmitters without fluid loss detection means. However, if some fill fluid leaks from one side of the pressure cell the behavior can change radically to that of curve 98b. For small pressures, the only change is an offset due to a reduced pressure exerted on the sensing diaphragm by the quantity of fill fluid from which the leak occurred. But for pressures high enough to cause the switch element to close, the transmitter circuit forces the current to an offscale value of about 2 milliamperes. This "hard" failure occurs before transmitter response time is significantly degraded from excessive fill fluid loss, and immediately notifies the operator of a problem. If more fill fluid is lost, curve 98c shows that the DC offset at low pressures increases, and the offscale output level is achieved at lower pressures. Of course, if enough fill fluid leaks out, the transmitter output will remain at the 2 mA offscale value over the entire pressure range. Curves 98b and 98c correspond to the case where fill fluid is lost from the high pressure side "H" of the pressure cell; if fluid instead leaks from the low side "L", the DC offset from curve 98a is in the opposite direction, although closing of the switch element will still drive the output to the 2 mA offscale value.

Figure 9:
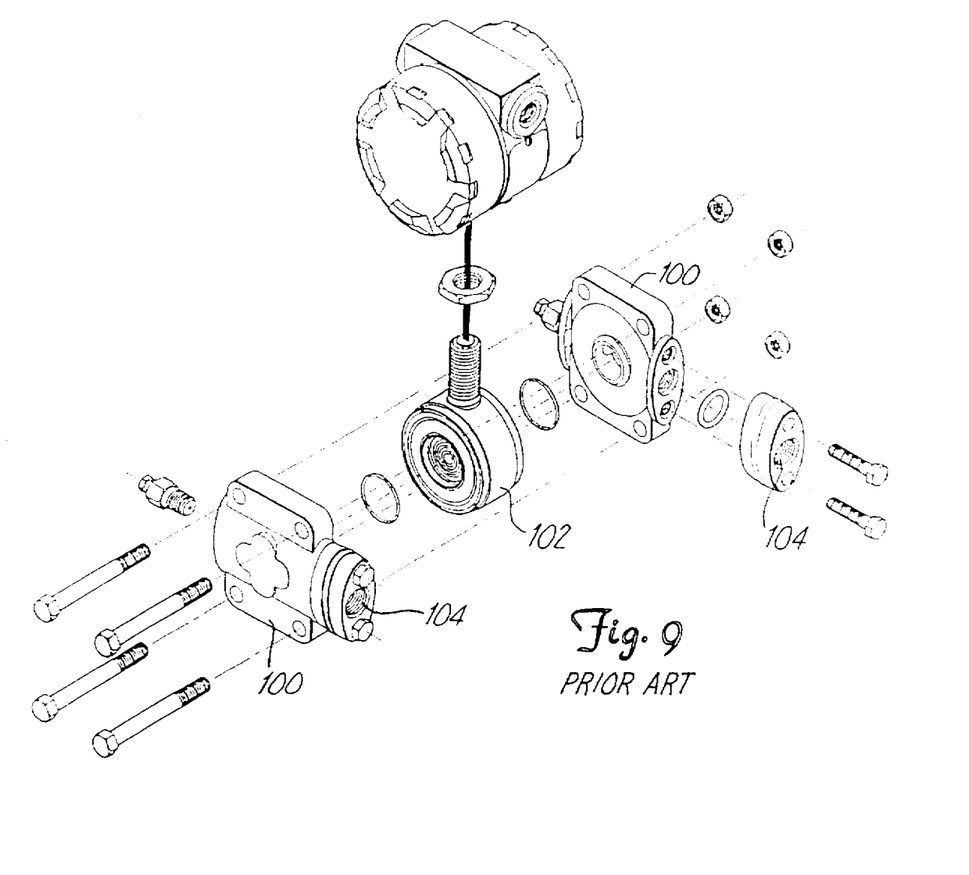
FIG. 9 is an exploded view of a PRIOR ART pressure transmitter outfitted with flanges.
Figure 10:
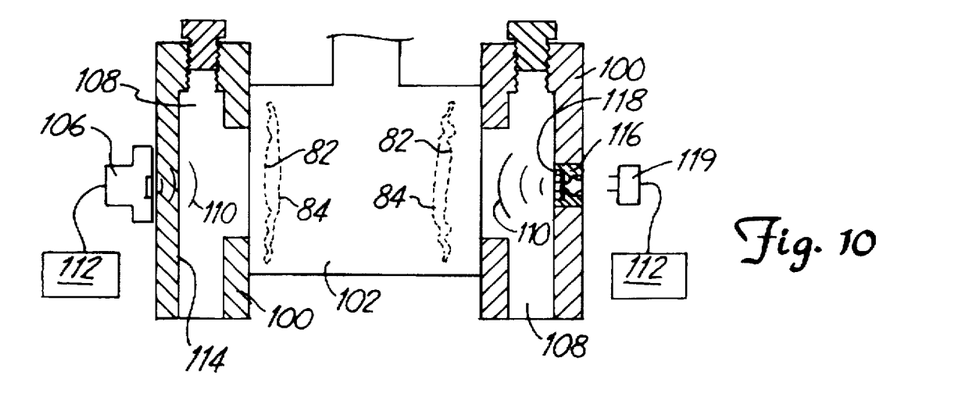
FIG. 10 is a rough sectional and block-diagrammatic view of additional embodiments of the present invention.

For convenience, the "H" and "L" designations have been dropped from FIGS. 9 and 10. The purpose of the exploded view in FIG. 9 of a known pressure transmitter is to demonstrate the known use of side flanges 100 with a pressure cell 102. Pressure cell 102 is similar to the pressure cell of FIG. 4, except that cell 102 does not have means for sensing fill fluid loss. Side flanges 100 carry process fluid from threaded ports 104 to the isolator diaphragms of pressure cell 102.

In FIG. 10, two arrangements are shown for measuring the isolator diaphragm position from a location on a process side of the isolator diaphragm rather than on a fill fluid side. Pressure cell 102 is shown in outline, with isolator diaphragms 82 and backplates 84 depicted only in broken lines for simplicity. Side flanges 100 similarly are shown in simplified form in section, with minor features or details ignored. In a first embodiment an operator couples an ultrasonic probe 106 to an outer surface of side flange 100 to measure the isolator diaphragm position in a manner similar to that described in connection with FIG. 2. During the test an interior chamber 108 of flange 100 should be filled with liquid-phase process fluid to permit transmission of ultrasonic waves 110 across the chamber 108. Driver/detection/readout device 112 is configured to reject signals received outside of a predetermined time window so that reflections from surfaces such as surface 114 of flange 100 do not interfere with the measurement of the isolator diaphragm position relative to the backplate. By knowing the pressure transmitter output, and also preferably the local temperature, the operator can compare the expected isolator diaphragm position from a simple chart or look-up table with the measured value. A discrepancy gives an indication of fill fluid loss. This first embodiment is compatible with existing transmitters with no changes to the structure or circuit of the transmitter.

In the second embodiment shown in FIG. 10, only the side flanges of the transmitter need be modified. A plug 116 with a piezoelectric chip 118 embedded therein is placed in a wall of each flange. Chip 118 generates and detects ultrasonic waves. When an operator couples plug 116 to the driver/detection/readout device 112 using a standard connector 119, he can measure the isolator diaphragm positions in the same manner as with the first embodiment described in the preceding paragraph, thereby monitoring fill fluid leakage.

In a third embodiment, not shown, a rod-shaped probe can be inserted into chamber 108. The probe, coupled to a driver/detection/readout device 112, includes the piezoelectric chip 118, and can launch and detect ultrasonic vibrations as discussed in the previous two embodiments.

Although the present invention has been described with reference to preferred embodiments, workers skilled in the art will recognize that changes may be made in form and detail without departing from the spirit and scope of the invention. For example, the present invention is applicable not only to pressure transmitters but also flow transmitters and other transmitters utilizing a fill fluid-coupled pressure sensor. Further, the transmitters may have just one, or two, or more than two isolator diaphragms. The invention is also applicable to transmitters where the isolator diaphragm or diaphragms remain substantially stationary relative to the backplate as a function of applied pressure. Workers skilled in the art will recognize that inductive, magnetic, optical, and other known position measuring techniques can be used in place of a capacitive or ultrasonic arrangement to measure the isolator diaphragm position(s).

What is claimed is:

1. A transmitter responsive to a pressure, comprising:

an isolator diaphragm exposed to the pressure, an increase in pressure urging the diaphragm toward a backplate, the backplate and the diaphragm having a space therebetween;

a flange carrying process fluid to the isolator diaphragm;

a pressure sensor having a pressure output;

a fluid filling the space and transmitting the pressure to the pressure sensor;

a non-contact position sensor disposed proximate the isolator diaphragm and providing a position signal to monitor a position of the isolator diaphragm, thereby to monitor loss of fluid from the transmitter, wherein the non-contact position sensor includes an ultrasonic transducer which couples to the flange;

a temperature sensor thermally coupled to the fluid and providing a fluid temperature signal; and a circuit coupled to the pressure sensor, non-contact position sensor and the temperature sensor for monitoring loss of the fluid, the circuit ascertaining an expected position of the isolator diaphragm as a function of the pressure output, the position signal and the fluid temperature signal.

2. In a transmitter having a pressure sensor coupled to an isolator diaphragm by a fluid, a method of detecting fluid loss comprising:

monitoring a position of the isolator diaphragm;

measuring a temperature that is representative of the isolator diaphragm temperature;

ascertaining an expected position of the isolator diaphragm due to thermal volumetric change of the fluid as a function of the measured temperature; and comparing the monitored isolator diaphragm position with the expected position.

3. The method of claim 2, wherein the monitoring step includes monitoring a capacitance between an electrode and the isolator diaphragm.

4. The method of claim 2 further comprising the step of measuring an output of the pressure sensor, and wherein the ascertaining step is a function of the measured output of the pressure sensor.

5. A transmitter, comprising:

a pressure sensor fluidically coupled to at lest one isolator diaphragm by a fill fluid, the pressure sensor utilizing a first measurement technique;

a temperature sensor thermally coupled to the fluid, providing a fluid temperature signal based on a temperature of the fluid;

a measurement circuit coupled to the pressure sensor and the temperature sensor;

a non-contact position sensor for monitoring loss of fill fluid, the non-contact position sensor utilizing a second measurement technique;

a switch coupling the measurement circuit selectively to the pressure sensor and to the non-contact position sensor; and wherein the first and second measurement techniques are capacitance measurement techniques, and wherein the measurement circuit ascertains an expected position of the diaphragm due to thermal volumetric changes based on the fluid temperature signal.

* * * * *

UNITED STATES PATENT AND TRADEMARK OFFICE
CERTIFICATE OF CORRECTION

PATENT NO.  : 5,760,310
DATED       : June 2, 1998
INVENTOR(S) : Stanley E. Rud, Jr., et al.

It is certified that error appears in the above-indentified patent and that said Letters Patent is hereby corrected as shown below:

Col. 10, line 2, change "lest" to --least--.

Signed and Sealed this

Ninth Day of February, 1999

Attest:

Attesting Officer

*Acting Commissioner of Patents and Trademarks*